CONTROL LINKAGE FOR CARTRIDGE TYPE MAGNETIC RECORDING AND REPRODUCING DEVICE

Filed Feb. 13, 1957

INVENTOR.
Emil Tiger
BY
Silverman & Mullin
Attorneys

May 30, 1961 E. TIGER 2,986,318

CONTROL LINKAGE FOR CARTRIDGE TYPE MAGNETIC RECORDING AND REPRODUCING DEVICE

Filed Feb. 13, 1957 4 Sheets-Sheet 2

SLOW PLAY

INVENTOR.

Emil Tiger

BY

Silverman & Mullin attorneys

May 30, 1961 E. TIGER 2,986,318

CONTROL LINKAGE FOR CARTRIDGE TYPE MAGNETIC RECORDING AND REPRODUCING DEVICE

Filed Feb. 13, 1957 4 Sheets-Sheet 3

INVENTOR.
Emil Tiger
BY
Silverman & Mullin
attorneys

May 30, 1961 E. TIGER 2,986,318

CONTROL LINKAGE FOR CARTRIDGE TYPE MAGNETIC RECORDING AND REPRODUCING DEVICE

Filed Feb. 13, 1957 4 Sheets-Sheet 4

Inventor
Emil Tiger
By Silverman & Mullin
Attorneys

United States Patent Office 2,986,318

Patented May 30, 1961

2,986,318

CONTROL LINKAGE FOR CARTRIDGE TYPE MAGNETIC RECORDING AND REPRODUCING DEVICE

Emil Tiger, Skokie, Ill., assignor to Pentron Electronics Corporation, a corporation of Illinois Filed Feb. 13, 1957, Ser. No. 639,917

6 Claims. (Cl. 226—178)

This invention relates generally to reproducing and/or recording devices which use the familiar and well-known magnetic tape as the recording medium, and more particularly the invention is concerned with improved control linkages for use with a device which operates in association with a cartridge.

In my co-pending application Serial No. 569,817, filed March 6, 1956, entitled "Tape Transporting Device for Use With Cartridges" which matured into Patent No. 2,898,409 granted August 4, 1959, there is described a device which receives a cartridge having a coil of magnetic tape therein, and through the use of a single control, transports the tape of the cartridge past an electromagnetic head. For a detailed explanation and illustrations of the structure, reference may be had to the said co-pending application, but generally the construction and operation of the device will be explained below, since this invention is concerned with an improved control linkage enabling additional functions to be performed by the device, and enabling the functions described in said co-pending application to be performed in a novel and more efficient manner.

The tape cartridge normally has a rectilinear section which is disposed at one level spaced above the panel of the device in a protected channel. In the device of the co-pending application, there is a single control knob and suitable linkages and couplings connected therewith to operate the device. With the control knob in a neutral position, the tape pressure pad is separated from the electromagnetic head, the drive capstan is spaced from the pressure roller, the fast wind capstan is spaced from the pressure roller, and the motor is not energized. A cartridge clamping device is disposed in angular raised position relative the surface of the panel of the device to receive the cartridge, and the cartridge may be manually pushed into operating position, releasing the clamping device which snaps upon the cartridge, indexing same into perfect operating position, and moving the rectilinear section to a proper level where it can be transported. In this latter position the rectilinear section is between the pressure roller and the wind and drive capstans, and also disposed between the pressure pad and head. The control knob can be rotated in one direction about 60° against a spring bias to manually raise the clamping device and permit an automatic ejector to eject the cartridge from the operative position. This invention is principally concerned, however, with the linkages which are operated when the control knob is rotated in an opposite direction.

From the neutral position, the first movement of the knob about 60° in a direction opposite to the reject direction disposes the control knob in a slow tape drive position. During the movement of the knob, the motor is energized thereby commencing rotation of the drive capstan (but not the fast wind capstan), the pressure pad is moved against the head thereby pressing the tape to the pole or poles, and the pressure roller is moved against the now rotating drive capstan. The tape is now transported in close proximity to the head at a slow speed, say 3¾ inches per second. Other switches or controls can determine whether the electrical relationship between the head and tape and other electronic equipment is such as to record, reproduce, or erase. These latter functions are no concern, either of the invention of the said co-pending application, or of this application.

The next position of the knob is a fast tape drive position, and in moving the knob, a linkage shifts a belt from a first portion of a drive pulley to a second portion of the drive pulley of greater diameter. The tape is thus transported at a greater speed, say 7½ inches per second. No other changes are made in the relationship of the various parts of the device. Basically, in the improved structure of this application this occurs, as well, although means are provided for adjustment of the belt shifting device.

In the device of the co-pending application, the next position of the control knob, that is, continuing in the same direction of rotary movement, is the fast wind position. In this case it is desired to transport the tape at a much faster speed than used for recording or reproducing, as for example where it is desired to move the tape to the beginning of a selection recorded thereon, or the like. While accomplishing this last movement, the pressure pad and head are separated, to permit the tape to move freely and without noise, and the pressure roller and drive capstan are also separated. When the movement has been completed, a lever has moved a rotation transfer mechanism bodily into engagement with a part of the flywheel rotated by the motor, and the fast wind capstan, now being rotated at high speed, is in engagement with the pressure roller, the tape being disposed between.

In moving the control knob from fast wind position, through fast drive and slow drive to neutral, the functions are performed which re-establish the various conditions described above.

One difficulty may arise with a structure as described in said co-pending application. When moving from fast wind directly to the position of fast drive, the difference in speed is so great that the rotating coil of tape in the cartridge may, through inertia, cause substantial spill-over of tape. This results in tangling, creasing and breakage.

In accordance with the present invention, this difficulty has been substantially eliminated through the medium of an improved linkage and control, and the primary object of the invention is the provision of such linkage and control.

Another object of the invention is to provide a structure in a device of this character in which the control, in being moved from fast wind to fast drive, passes through an intermediate position in which the fast moving tape is given a opportunity of slowing to a lesser speed or coming to a stop, means being provided to relieve the pressure of the fast wind capstan from the pressure roller without applying the pressure of the fast drive capstan to the pressure roller.

Other objects of the invention lie in the provision of simpler and more readily adjustable linkages for achieving the desired operation of the device.

A preferred manner of carrying out the invention is described in detail hereinafter and illustrated in the accompanying drawings in which.

Figures 1, 6:
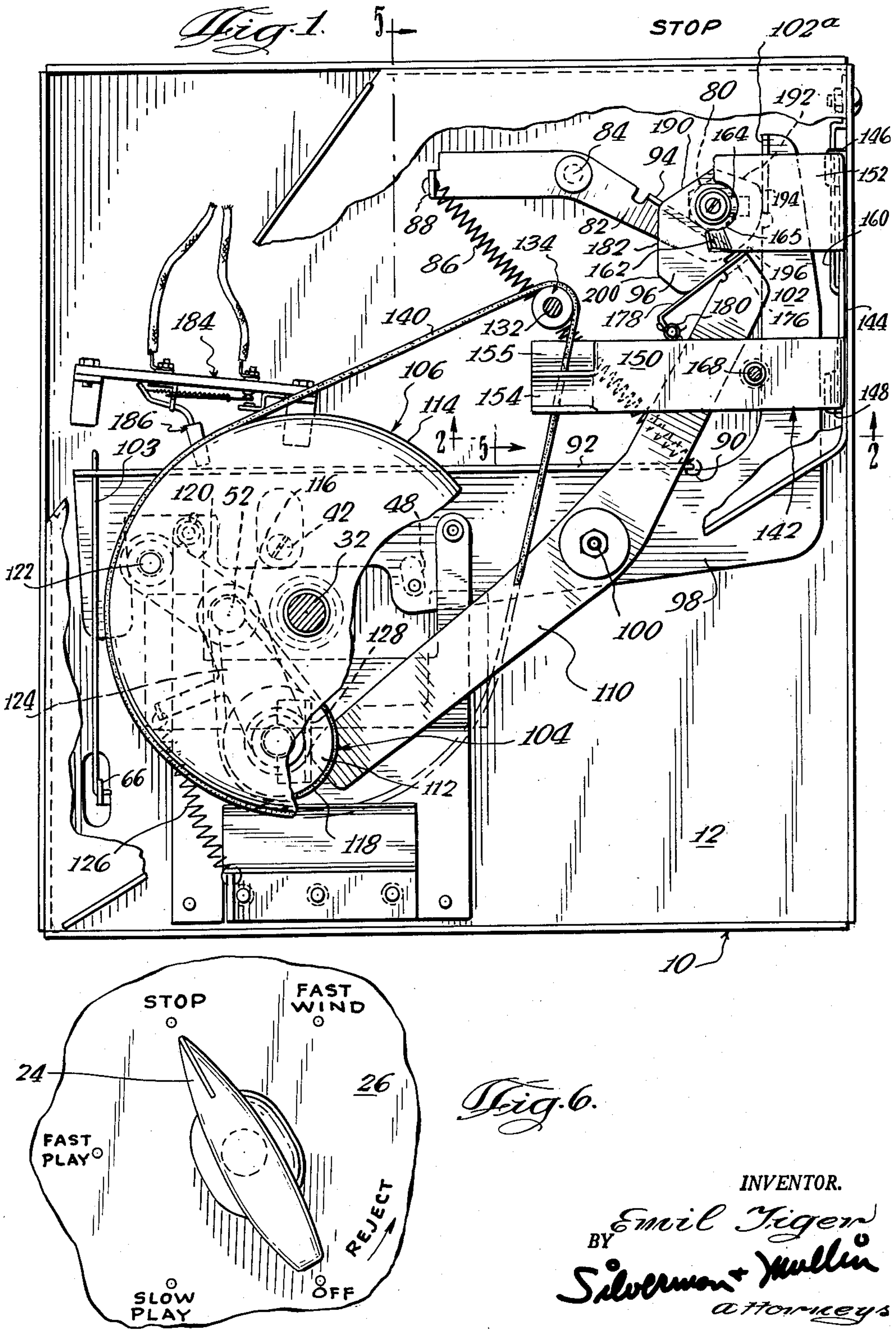
Fig. 1 is a bottom plan view of the mechanism of the invention with portions being broken away in order to show the construction and explain the operation thereof. The condition of the device is that of stop, or pause between fast wind and fast tape drive conditions.
Fig. 6 is a top plan view of a fragment of the device illustrating the single control knob and its various positions.

As previously stated the device of the invention is an improvement over the device which has been shown, described, and claimed in the co-pending application, and hence the details of construction and operation which are common to the two need not be expanded upon. Furthermore, since the invention of this application relates only to the mechanical construction of the linkages and connections for use during transportation of the tape, no mention is made of the electrical circuitry, and none of the modifications of the device in said patent will be illustrated.

The reference character 10 is used to designate the device generally, and the same may be simply a tape playing device for use with cartridges, or a tape recording device or both. The top platform panel or plate 12 carries much of the mechanism on its bottom surface and carries the structure for receiving, positioning and ejecting the cartridge upon its upper surface. A subchassis in the form of a plate 14 is mounted parallel with and spaced from the bottom of the platform panel or plate 12 by any suitable means such as flanges 16 cooperating with upstanding flanges 18 formed on the plate 14. The exact structure of the chassis is not material to the invention.

Figure 2:
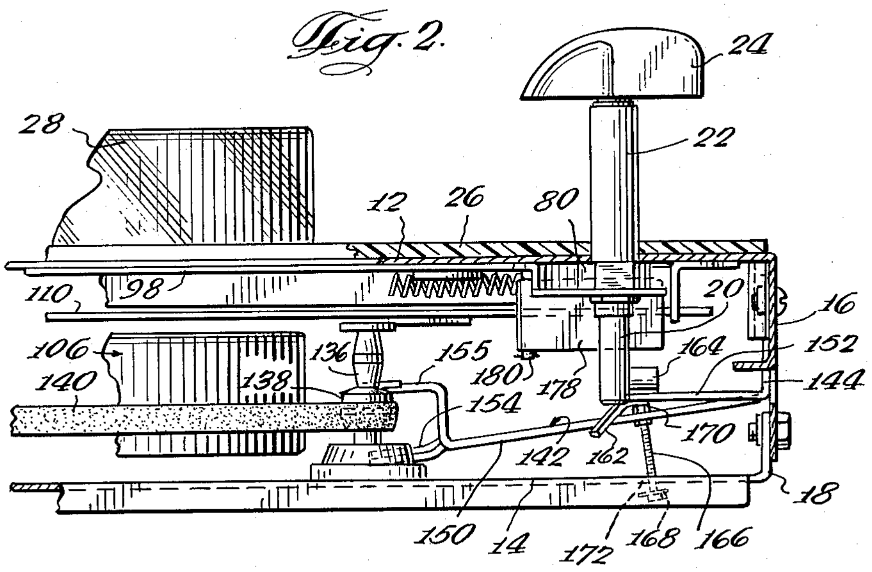
Fig. 2 is a sectional view taken through the device taken generally along the line 2—2 of Fig. 1 and in the indicated direction.
Figures 4, 5:
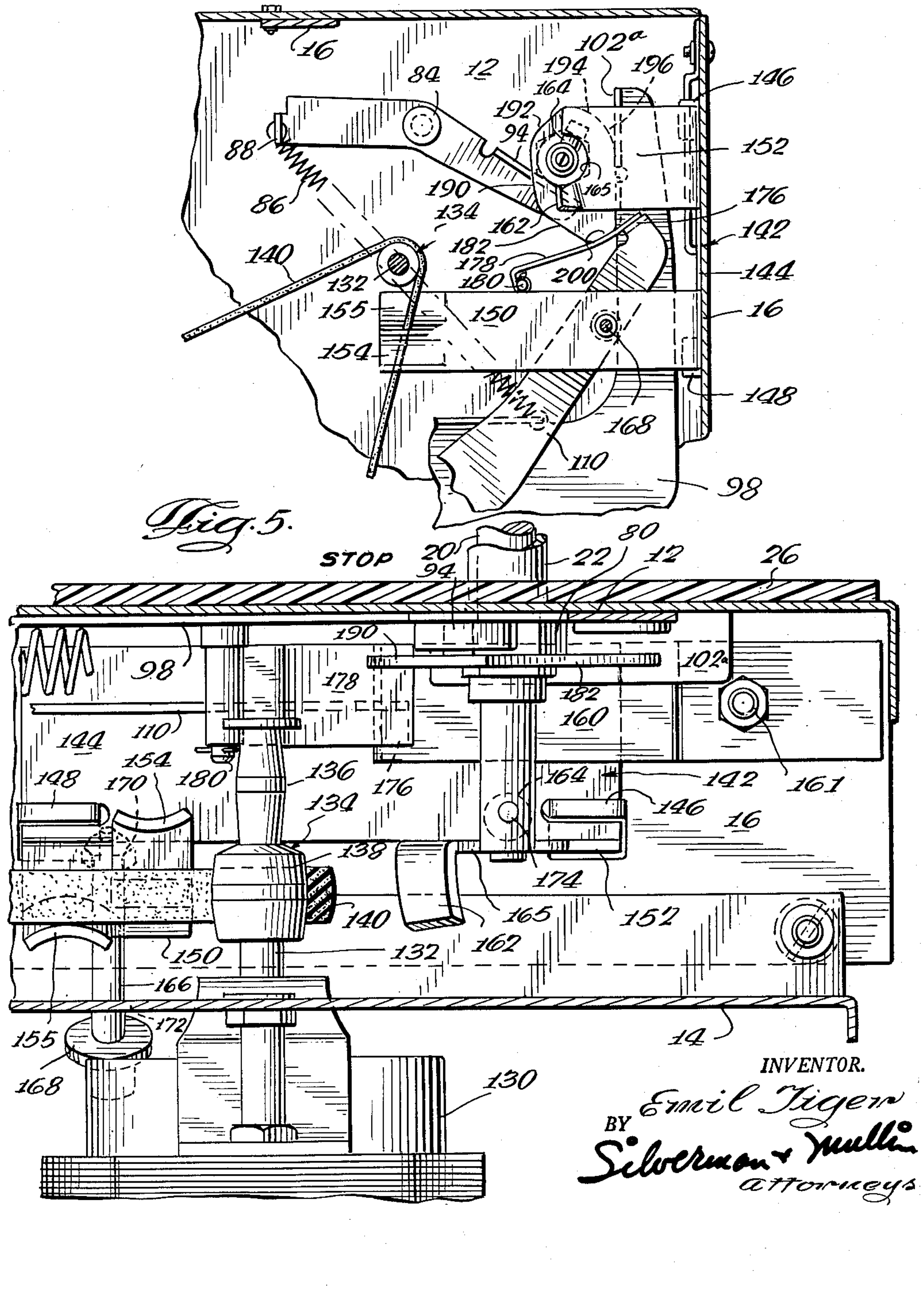
Fig. 4 is a similar view showing the relationship of the various linkages during fast wind condition.
Fig. 5 is a sectional view through the device along the line 5—5 of Fig. 1 and in the indicated direction.

As seen in Figs. 2 and 6, there is a single control shaft 20 suitably journalled in the platform plate 12 and extending out the top thereof as shown, the sleeve 22 being a portion of the journal which may be swaged to the plate 12. This is shown in Fig. 5. At the top of the shaft 20 there is provided a knob 24 which is arranged to move to a plurality of positions of rotation approximately 60° apart indicated by indicia or markings provided upon the trim plate 26 or upon a separate escutcheon plate if desired. Attention is invited for the moment to Fig. 6 in order to explain the various positions. The knob 24 and its connected shaft 20 are manually rotatable and the various positions are detented so as to comprise steps in the rotation. Starting with the position marked "Off," this position has neither of the drive capstans engaged against the pressure roller. The pressure pad is free of the electromagnetic head so that the cartridge (a fragment being shown at 28) may be inserted, positioned, and automatically indexed and clamped into position in the manner explained in the co-pending application. Rotating the knob 24 in a clockwise direction to the next position which is 60° away, and is marked "Slow Play," the motor is energized, the tape seized between the pressure pad and electromagnetic head, the tape drive capstan is moved into engagement with the pressure roller, and the tape commences to move at slow speed, about 3¾ inches per second. In moving the knob to the next position, that of "Fast Play," the only function accomplished is the change of the speed to cause the tape to move at about 7½ inches per second.

In the next clockwise rotational movement of the knob, the pressure pad separates from the head and the drive capstan separates from the pressure roller with the result that the tape comes to a stop. It is free to be transported at high speed, if desired. This position is the "pause" position above referred to, and in Fig. 6 it is marked "Stop." The knob 24 is shown resting at this particular location.

The next movement of the knob 24 in a clockwise direction has no effect upon the positions of the pressure pad and tape drive capstan, leaving them in the positions assumed when the knob was at "Stop." The rotation transfer mechanism which couples the flange of the flywheel to the fast wind capstan is now moved to active position, and the fast wind capstan comes into engagement with the pressure roller, the tape being disposed between. Obviously the tape will now be freely transported at a much greater winding speed than in either of the prior play positions.

In rotating the knob 24 from "Fast Wind" position, counter-clockwise back to "Stop" position, the only function performed, insofar as the tape is concerned, is the relief of the fast wind capstan from engagement against the pressure roller. Thus, the rotating coil in the cartridge can slow to a stop without the inertia causing spillover, which would be likely to occur if the condition of "Fast Play" immediately followed "Fast Wind." This is because the tape is gripped for a much lesser speed in "Fast Play" position and the inertia of the fast rotating coil in the cartridge will cause continued free movement of the tape even after the fast wind drive has been removed from the tape.

Figure 7:
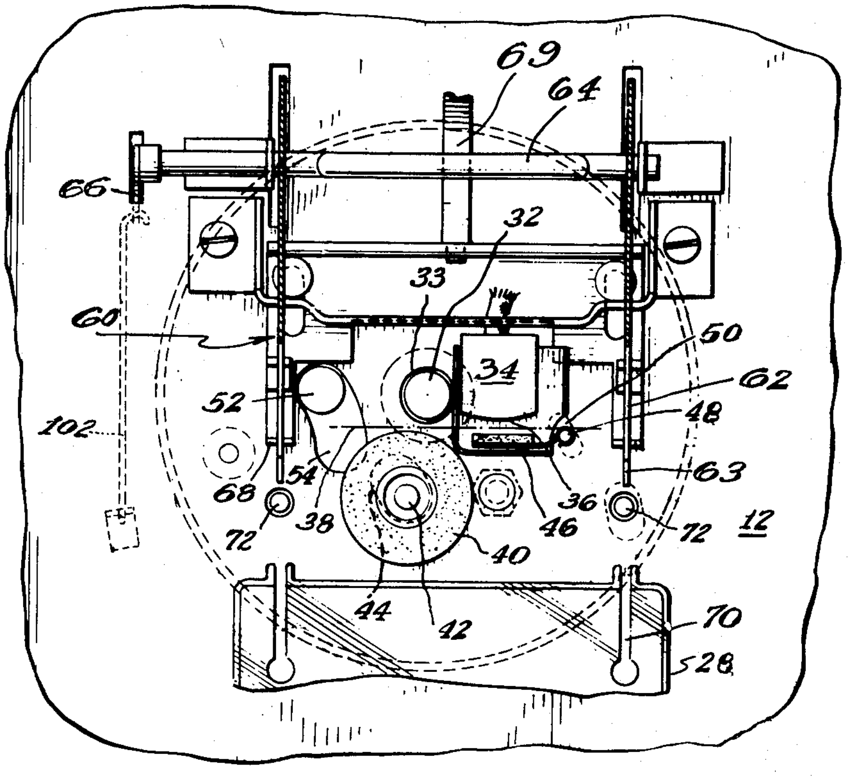
Fig. 7 is a fragmentary top plan view of the magnetic reproducing and/or recording device with portions in section showing the relationship of the various elements which cause the transportation of the tape, its engagement and release, and the retention of the cartridge upon the device.

The various elements which have been described above in setting forth the positions of the knob 24 are illustrated to some extent in Fig. 7. The drive capstan is shown at 32 journalled at 33 alongside of the electromagnetic head 34 which presents its pole 36 to the electromagnetic tape. The general path of the electromagnetic tape is indicated by the reference character 38 and is shown as a broken line in the view. The particular arrangement of the parts in Fig. 7 could be either immediately after the cartridge 28 has been ejected or immediately before the cartridge is inserted. The pressure roller 40 is an idler and is mounted on a stub shaft 42 by means of which the entire roller can be moved forward, that is into engagement with the drive capstan 32 by reason of the slot 44 formed in the panel 12.

The pressure pad is designated 46, and it is mounted on a post 48 which likewise can move to bring the pressure pad into engagement with the pole 36. This latter movement is accomplished through suitable linkages and is permitted by reason of a slot 50 formed in the panel 12. The fast wind capstan 52 also extends above the panel 12 and is normally located as shown in Fig. 7 at the end of the slot 54, but when the knob 24 is moved to the fast wind position, the fast wind capstan 52 moves down to engage against the pressure roller 40 for driving the tape 38 at a fast speed.

Mention has been made of the clamping, indexing and release of the cartridge 28. This mechanism is designated generally by reference character 60 in Fig. 7, and some of the related elements thereof might well be pointed out. There is a clamping device 62 which, although of channel formation, merely has the side portions shown in the view since the section is taken through these side portions. This clamping device 62 is mounted for swinging movement upon a shaft 64 journalled upon the panel 12 which may be raised and lowered by means of a connecting link 66. There is a combined latch and pusher mechanism 68 which cooperates with the cartridge. Upon insertion it is spring loaded by spring 69 and during its movement pushed out of the way of the biased channel member 62 so that it may drop upon the cartridge 28 carrying the free ends 63 into suitable slots 70 to bring the tape to proper level. Simultaneously, indexing members 72 rise from the panel 12 into openings provided therefor in the cartridge. When the knob 24 is moved in a counter-clockwise position marked "Off" and the direction indicated by the word "reject" in Fig. 6, the link 66 rotates the shaft 64 raising the clamping device 62 so that the pusher 68 suddenly projects the cartridge 28 out of its operative position.

Attention is now invited to the illustration of the construction of the linkages whereby the described operations are rendered possible. To the center of the shaft 20 immediately adjacent the bottom surface of the plate or panel 12, there is secured a member 80 which may be a hexagonal nut presenting surfaces to a spring-pressed dog 82 pivotally mounted at 84 and biased to rotate in a counter-clockwise direction as viewed in Fig. 1 by virtue of a helical spring 86 suitably stretched between an ear 88 formed on the dog 82 and an opening 90 in a flange 92 presently to be described. Bearing surface 94 cooperating with the hexagonal member 80 provides the detent action during rotation of the shaft 20.

Mounted to the shaft 20 below the hexagonal member 80 there is provided an irregular shaped cam member 96 having various cam contours to accomplish the functions described. This principal operating lever consists of a large L-shaped member 98 pivoted to the bottom of the panel 12 at 100 and having an elongate arm 102, the end of which is disposed to be engaged along a bearing flange 102*a* by various cam surfaces of the irregular cam member 96. It should be seen that the spring 86 beside biasing the dog 82 into engagement with the detent member 80 also tends to bias the lever 98 to rotate in a counter-clockwise direction as viewed in Fig. 1. Both the shaft 42 of the idler roller 40 and the post 48 of the pressure pad 46 are secured to the larger portion of the L-shaped lever 98 so that any movement of this lever will likewise move the pressure roller 40 as well as the pressure pad 46. There is a lost motion connection between the link 66 and the flange 92 of the lever 98 through the medium of a connecting rod 103 by means of which suitable movement of the lever 98 will raise the channel member 62 to enable ejection of the cartridge 28 from operative position.

The fast wind capstan 52 is a part of a rotation transfer mechanism designated generally 104. This mechanism is located on the interior of the fly-wheel 106 (which rotates with the main drive shaft 32) and is arranged so that upon proper movement of the fast wind lever 110 in a clockwise direction about the pivot 100, one rotating part 112 of the rotation transfer mechanism 104 will move to the left as viewed in Fig. 1 into engagement with the interior of the flange 114. It will be noted that there is a second rotating portion of the rotation transfer mechanism 104 which is designated 116 and which is coaxial with the fast wind capstan 52 and connected with the rotating part 112 by means of a belt 118. The fast wind capstan 52 is on the end of a link 120 pivoted at 122 so that the movement of the fast wind lever 110 in a clockwise direction will not only move the fast wind capstan 52 into engagement with the pressure roller 40 but likewise will cause the belt 118 to be engaged with the interior of the flange 114 so the fly-wheel 106 will commence rotation thereof. Note that the link 124 which supports the rotating members 112 and 116 is spring-biased by a suitable spring 126 to tend to pull the fast wind capstan out of engagement with the pressure roller 40 and cause the lever 110 to tend to rotate in a counter-clockwise direction. The link 124 also has a camming surface 128 which cooperates with the bottom end of the lever 110.

Rotation for the device is achieved through the medium of a motor 130 having a shaft 132 which mounts a pulley 134 provided with a small cross-section portion 136 and a larger diameter portion 138. A suitable belt 140 of flexible material, such as rubber is looped between the pulley 134 and the fly-wheel 106. The presence of the belt upon either of the two portions 136 and 138 provides the two tape drive speeds designated "slow" and "fast."

A speed change member 142 is mounted upon the inside of the flange 16 being provided with a flat locking part 144 slotted at its ends to accommodate pivots 146 and 148. Looking at Fig. 3 the flat portion 144 has two lateral extensions 150 and 152. The extension 150 is bifurcated at its end opposite the connection with the flat part 144 to provide a pair of fingers 154 and 155 offset from one another (perpendicular to the plane of the paper as viewed in Fig. 3) and straddling the belt 140. Swinging the extension 150 up and down as viewed in Figs. 2 and 5 will therefore result in shifting of the belt from one part of the pulley 134 to the other. Normally the extension 152 is up, as considered in Figs. 2 and 5, by reason of the flat part 144 of the member 142 being urged into engagement with the flange 16 by means of a flat leaf spring 160 secured at 161 and pressing against the surface of the flat part 144. This is best seen in Fig. 5.

The short extension 152 of the member 142 has a downwardly bent camming portion 162 at its free end which cooperates with a lateral stud 164 secured to the lower end of the shaft 20. When the shaft is rotated, the stud 164 will engage upon the bent camming portion 162 and ride up on the body of the extension 152. Note that there is an arcuate recess 165 which is disposed about the shaft 20 to enable the stud to follow the rotation of the shaft 20 and still be engaged upon the extension 152. When this has occurred, the extension 152 is forced to swing downward, thereby rocking the entire member 142 on its pivots 146 and 148 and also lowering the bifurcated end of the extension 150. This shifts the belt 140 from the position engaging the smaller diameter portion 136 of the pulley 134 to the larger diameter portion 138 and thus increases the speed of the flywheel 106.

The desired location of the positions of the belt 140 upon the crowns of the parts 136 and 138 of the pulley is susceptible of adjustment by simple means. In the case of the upper position of the belt 140, that is engaging with the part 136, the extension 150 has an adjusting screw 166 the bottom end of which has a larger washer or the like at 168. The screw has its upper end mounted to the extension 150 at 170 and its bottom end protruding through a hole 172 in the chassis 14. Obviously, the washer 168 limits upward movement of the extension 150 and hence controls the placement of the belt 140 upon the pulley portion 136.

The stud 164 has a screw threaded neck 174 by means of which the stud is secured to the shaft 20, but the neck is eccentric of the stud (see Fig. 5), so that the position of the stud may be adjusted up and down relative the shaft 20, within certain limits. Thus, the amount of downward movement of the extension 152 and hence the member 142 can be controlled to control the placement of the belt upon the pulley portion 138.

The lever 110 which is described as the fast wind lever is spaced below the principal lever 98 by means of a spacer (not shown) and pivoted on the same pivot 100. The end opposite the end 112 has a bearing flange 176 which is disposed to be engaged by certain camming edges of the cam member 96 but instead is engaged by a flat resilient spring 178 which is pivotally mounted on a post at 180. The cam member 96 must therefore apply any pushing force upon the lever 110 through the spring 178. The purpose for this will be described shortly.

The conditions of the various linkages will now be described for the various positions of the knob 24 and shaft 20.

There is no illustration of the "Off" position, except for Fig. 7 which does not show the actuating linkages. Considering Fig. 1, however, the arrangement is readily explained. Pressume the shaft 20 and camming member 96 are rotated clockwise in the view 180°, bringing the linkages to the "Off" condition. The cam edge 182 will be engaged against the bearing flange 102*a* and hence the position of the lever 98 will be somewhat clockwise of the position illustrated in Fig. 1. The rotation transfer mechanism 104 will be about the same as in Fig. 1 and hence the position of the lever 110 will also be about as shown. As a matter of fact, this will be approximately the position of lever 110 and its spring 178 in all positions except "Fast Wind" and hence reference thereto need not be made in explaining the other positions of operation.

The flat of the flange **102*a* and the camming edge 182 as well as the detent means 82 and 80 retain the lever 98 in the described position for "Off." Note that a toggle switch 184 has a control arm 186 adapted to be engaged by the flange 92 of the lever 98. When pressed upward, as viewed in Fig. 1, the switch 184 is open. The only circumstances under which this occurs is when the knob 24 is on "Off" and the lever 98 is slightly clockwise as described. The switch 184 is intended to energize the motor 130 and hence, on "Off" position, the motor is not rotating. The stud 164 is positioned opposite the arcuate recess 165 and hence the belt 140 is engaged upon the smaller diameter portion 136. The stub shaft 42 and the post 48 are disposed as shown in Fig. 7 and hence there is a substantial space to freely admit the tape into operative position 38 by inserting the cartridge 28** and clamping and indexing the same in position.

Presuming the cartridge is in operative position, the knob 24 is next moved to "Slow Play" position, approximately 60° as seen in Fig. 6. Rotation of the shaft 20 through 60° (as viewed from the bottom of the device) moves the next cam edge 190 opposite the flange **102*a*. The lever 98 is released from the edge 182 and hence is free to be moved in a counterclockwise direction by the spring 86, its movement being stopped only when the pressure roller 40 is engaged against the tape drive capstan 32. The stub shaft 42 has thus moved along the slot 44, and the post 48 along the slot 50 pressing the tape against the pole 36 of the electromagnetic head 34**.

Figure 3:
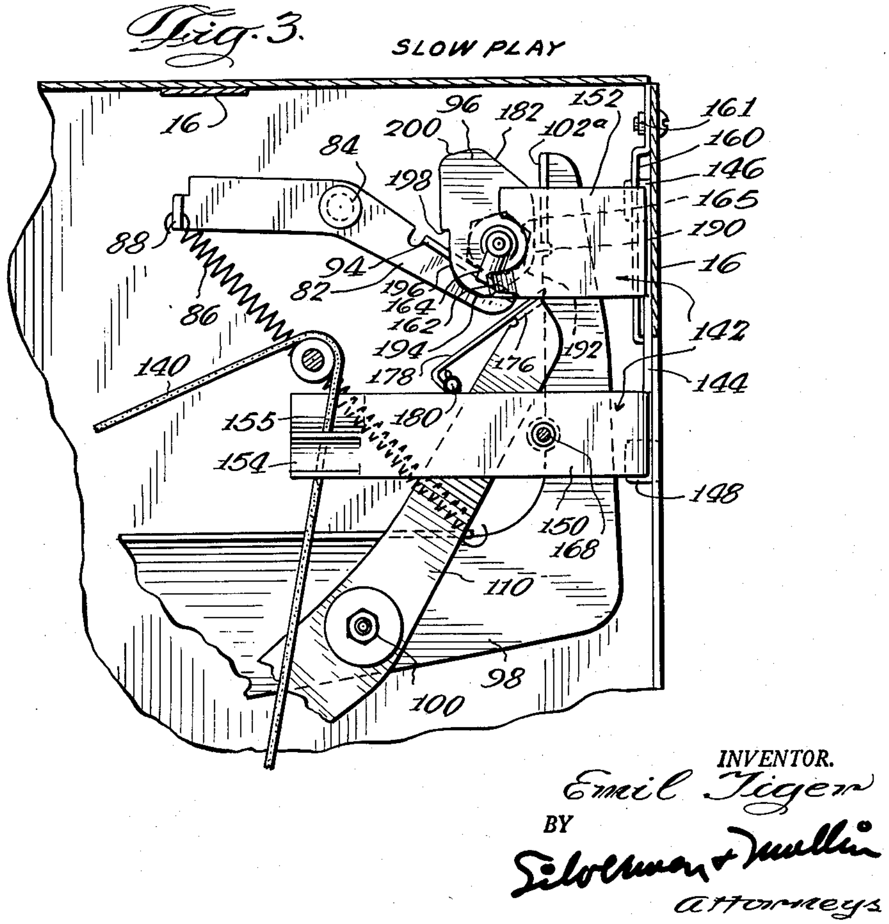
Fig. 3 is a fragmentary view similar to that of Fig. 1 but showing the relationship of the various linkages during slow tape drive condition.

As explained previously, in this as well as other positions to be described, the lever 98 is disposed as shown in Fig. 3, moving away from the arm 186 and hence closing the switch 184 and energizing the motor 130. Thus, the drive capstan 32 is rotating along with the flywheel 106, being driven by the belt 140 and the pulley 134 at slow speed, i.e., 3¾ inches per second. The position of the stud 164 has changed, but insufficient to depress the extension 152. This can be seen from an examination of Fig. 3, which is the condition of "Slow Play." Note that there is a slight space between the flange **102*a* and the cam edge 190 because movement of the lever 98 is limited by the engagement of the pressure roller 40 against the drive capstan 32**.

If the knob 24 is rotated another 60° to the position "Fast Play" the next cam edge 192 is disposed opposite the flange **102*a* and spaced therefrom. Thus, nothing occurs in the linkages controlled by the lever 98, nothing occurs in the means controlled by the lever 110, and the motor is still energized. The rotation of the shaft 20, however, has now brought the stud 164 under the extension 152 and hence shifted the belt to the larger diameter part 138 of the pulley 134**. The condition of the speed shift mechanism is substantially as shown in Fig. 2.

The next position of the knob 24 is the "Stop" position described above, 60° beyond the "Fast Play" position. The cam edge 194 engages the flange **102*a*, and since it is radially further removed from the shaft 20 than either of the edges 190 or 192, it moves the lever 98 slightly clockwise, thus lifting the pressure roller 40 from the drive capstan 32 and lifting the pressure pad 46 from the pole 36 of the head 34. Obviously, the tape is now no longer being transported, although the drive capstan 32 is still rotating, and hence it comes to a stop. Nothing occurs to any of the other parts of the device, even the speed change mechanism maintaining the belt 140 on the larger diameter part of the pulley 134 since the stud merely assumes another position along the arcuate recess 165**. This "Stop" condition is illustrated in Figs. 1 and 5.

If the knob is rotated another 60°, the position of the lever 98 is unchanged because the edge 196 of the cam is a continuation of the cam edge 194 and the same distance from the shaft 20. This is the "Fast Wind" position. Further rotation of the shaft 20 is prevented by the shoulder 198 engaging the edge of the flange **102*a* as shown in Fig. 4. As the cam member 96 is rotated in a counter-clockwise direction as viewed in Figs. 1 and 4, from the "Stop" position of Fig. 1 to the "Fast Wind" position of Fig. 4, the cam edge 200 ridges against the spring 178 and applies pressure against the flange 176 of the lever 110. As previously explained, this sets the fast wind capstan 52 into rotation and presses it against the pressure roller to transport the tape at a high speed. In moving to the position shown in Fig. 4, the spring 178 is bowed in its center, thereby resisting return movement of the cam member 96 and hence cooperating with the detent means to hold the lever in place. This urges the detent means to hold the lever in place. This urges the rotating member 112 against the inside of the flange 114 of the flywheel 106. The resilient connection afforded by the spring 178 prevents the likelihood of so much pressure being applied by the lever 110 as to bind and cause stalling of the motor, or slippage of the belt 140**.

In moving the knob 24 in a reverse direction, carrying the various linkages from "Fast Wind" to "Fast Play" condition it is obvious that they will have to pass the intermediate condition of "Stop." If the tape is being transported at high speed and suddenly the condition of "Fast Drive" is assumed, it will be recalled that the tape will require to be gripped between the drive capstan 32 and the pressure roller 40 and will also require to be engaged between the pressure pad 46 and the head 34. The likelihood of spill-over, breakage, and binding is eliminated because of the intermediate position of "Stop" which will usually halt the movement of the tape at high speed so that there will be substantially no inertia in the coil within the cartridge.

It is believed that further explanation is unnecessary, the remaining portions of the device being substantially the same as those of the co-pending application and operating in substantially the same way. Considerable variation of the structure of the invention can be made without in any way departing from the spirit or scope of the invention as claimed hereinafter.

I claim:

1. In a magnetic recording and reproducing device in which a recording medium is transportable past an electromagnetic head at predetermined rates of speed by means of a single control member, in combination, a rotatable control cam connected to be rotated by said control member, a rotation transfer mechanism, a rotating member, and a capstan operable to effect such transportation at one of such speeds, said transfer mechanism adapted to be engaged against said rotating member to transfer the rotation thereof to the capstan, a lever connected to be engaged by the cam for moving the transfer mechanism upon rotation of the cam, and means providing a resilient connection between said lever and cam to prevent binding between the transfer mechanism and rotating member during such engagement.

2. In a magnetic recording and reproducing device in which a recording medium is transportable past an electromagnetic head at predetermined rates of speed by means of a single control member, in combination, a rotatable control cam connected to be rotated by said control member, a rotation transfer mechanism, a rotating member, and a capstan operable to effect such transportation at one of such speeds, said transfer mechanism adapted to be engaged against said rotating member to transfer the rotation thereof to the capstan, a lever connected to be engaged by the cam for moving the transfer mechanism upon rotation of the cam, and means providing a resilient connection between said lever and cam to prevent binding between the transfer mechanism and rotating member during such engagement comprising, a leaf spring arranged to absorb pressure of movement of the cam against said lever.

3. A structure according to claim 2 in which the leaf spring is disposed in a plane normal to the planes of movement of the cam and lever and said cam and lever engage said spring on opposite sides thereof spaced one from the other, thereby causing the spring to bow and hold the cam in engaged position.

4. In a magnetic recording and reproducing device in which a recording medium is transportable past an electromagnetic head at predetermined rates of speed selectable by means of a single control member, in combination, a rotatable control shaft connected to said control member, a speed changing member movable between two positions and having a forked end positioned straddling a drive belt for shifting same concurrently with said movement of the speed changing member, means for actuating said speed changing member comprising, a lateral projection on the shaft, an extension having a cam portion adjacent the shaft, said speed changing member being rockably mounted and said device having means biasing the speed changing member to one of said positions, said projection adapted to engage the cam portion when the shaft is rotated through said control member to rock the speed changing member to the second of said positions, whereby the belt is engaged by said forked ends to shift same.

5. A structure as claimed in claim 4 in which means are provided for adjusting the extent of rocking of the speed changing member.

6. A structure as claimed in claim 4 in which means are provided for adjusting the extent of rocking of the speed changing member, including said lateral projection being mounted on said shaft eccentrically on an axis perpendicular to that of the shaft and adapted to be fixed in rotated positions about its axis.

References Cited in the file of this patent

UNITED STATES PATENTS

| | | |
|---|---|---|
| 2,591,796 | Erwood | Apr. 8, 1952 |
| 2,612,565 | Heller | Sept. 30, 1952 |
| 2,645,495 | Nelson | July 14, 1953 |
| 2,680,613 | Williams | June 8, 1954 |
| 2,680,969 | Spengler | June 15, 1954 |
| 2,681,950 | Owens | June 22, 1954 |
| 2,724,276 | Sears | Nov. 22, 1955 |
| 2,751,438 | Baer | June 19, 1956 |
| 2,768,244 | Tiger | Oct. 23, 1956 |
| 2,813,686 | Schroter | Nov. 19, 1957 |
| 2,838,305 | Hoehn et al. | June 10, 1958 |
| 2,909,617 | Shields | Oct. 20, 1959 |
| 2,953,312 | Munroe | Sept. 20, 1960 |